Oct. 16, 1962  E. J. POSSELT  3,059,160
MOTOR CONTROL SYSTEMS
Filed Nov. 3, 1958  2 Sheets-Sheet 1

Oct. 16, 1962 E. J. POSSELT 3,059,160
MOTOR CONTROL SYSTEMS
Filed Nov. 3, 1958 2 Sheets-Sheet 2

Inventor
Edward J. Posselt
By H. R. Rather
Attorney 3,059,160
MOTOR CONTROL SYSTEMS
Edward J. Posselt, Milwaukee, Wis., assignor to Cutler-Hammer, Inc., Milwaukee, Wis., a corporation of Delaware
Filed Nov. 3, 1958, Ser. No. 771,408
11 Claims. (Cl. 318—57)

This invention relates to motor control system and more particularly to dynamic braking control systems for a multiplicity of series wound motors.

Herman Wilson and Charles Ritchie Patent No. 1,985,706, dated December 25, 1934, discloses dynamic braking means for a pair of series wound motors operable in parallel from a power supply source wherein the series field excitation for each motor is provided by the rotating armature of the other motor. The present invention relates to improved dynamic braking means applicable to three or more motors.

A general object of the invention is to provide improved braking means for a multiplicity of electric motors.

A more specific object of the invention is to provide improved means for dynamically braking three or more series wound direct current motors.

Another specific object of the invention is to provide a multiple motor drive with improved means for effecting dynamic braking in response to reduction or failure of the power supply voltage.

Another specific object of the invention is to provide a reversible multiple motor drive with improved control means operable to afford dynamic braking of the motors when overhauled in either direction.

A further specific object of the invention is to provide a reversible multiple motor drive having more than two motors with improved dynamic braking control means wherein the series field winding of each motor is excited by the armature-generated-current of one of the other motors.

Other objects and advantages of the invention will hereinafter appear.

While the apparatus hereinafter described is effectively adapted to fulfill the objects stated, it is to be understood that I do not intend to confine my invention to the particular preferred embodiments of motor control systems disclosed, inasmuch as they are susceptible of various modifications without departing from the scope of the appended claims.

Figure 1:
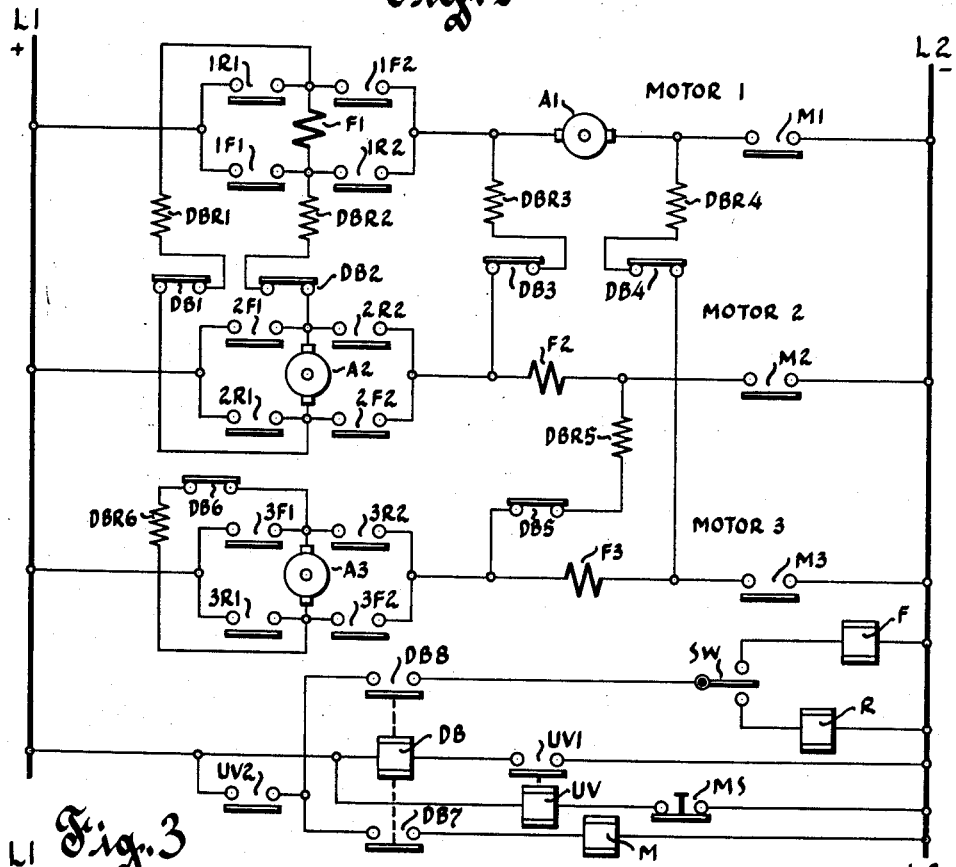
Figure 3:
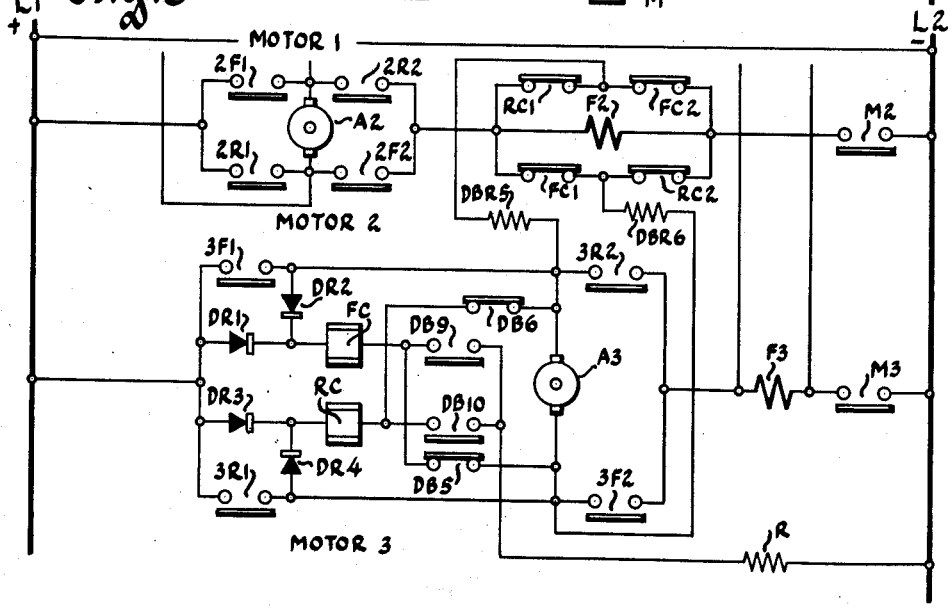
Figure 2:
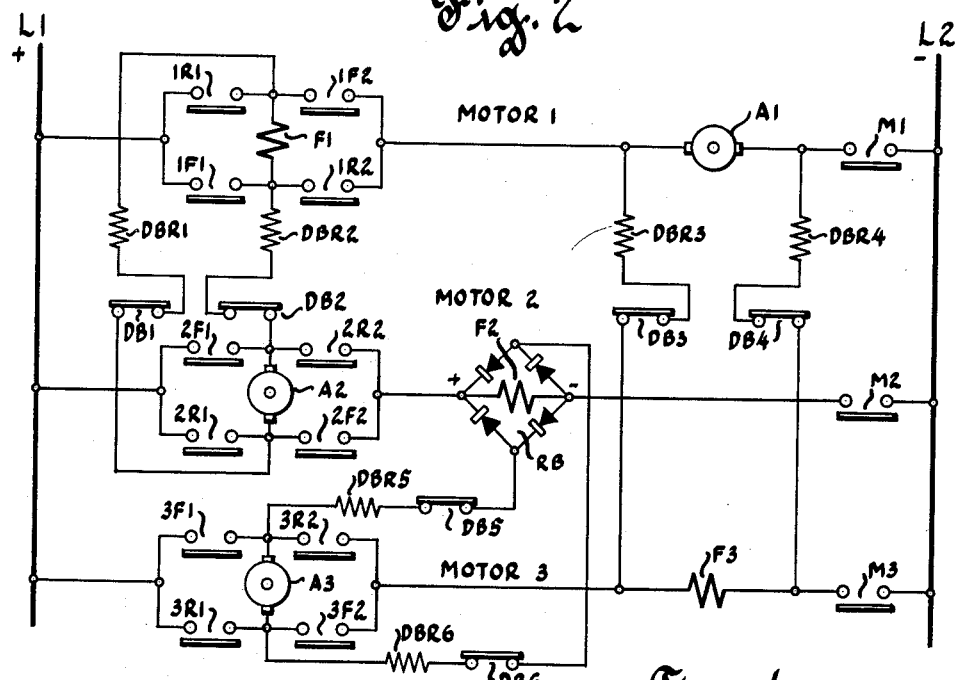
Figure 4:
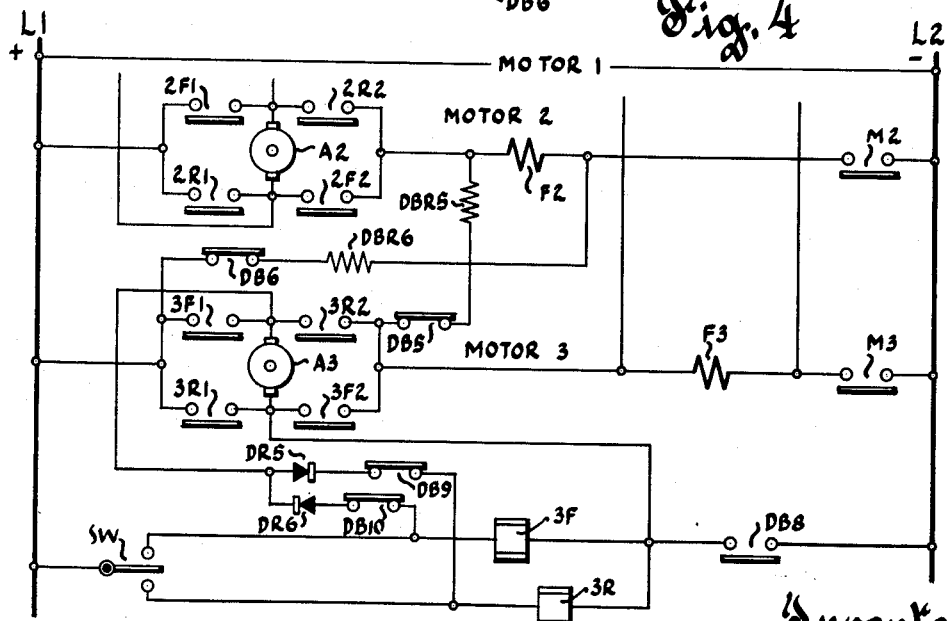

The invention will now be described in detail with reference to the accompanying drawings, wherein:

FIGURE 1 diagrammatically shows a motor control system constructed in accordance with the present invention;

FIG. 2 diagrammatically shows a modified motor control system;

FIG. 3 is a fragmentary circuit diagram showing a modification of the system of FIG. 2; and FIG. 4 is a fragmentary circuit diagram showing a modification of the system of FIG. 3.

Referring to FIG. 1, there are shown direct current motors 1, 2 and 3 connected in parallel across positive and negative power supply lines L1 and L2. Motor 1 is provided with an armature A1 and a series field winding F1, the latter being connected in a reversing bridge network comprising forward contacts 1F1 and 1F2 and reverse contacts 1R1 and 1R2 and the reversing bridge network and armature A1 being connected in series through normally open contacts M1 of a main contactor M across lines L1 and L2. Motor 2 is provided with an armature A2 a series field winding F2. Armature A2 is connected in a reversing bridge network comprising forward contacts 2F1 and 2F2 and reverse contacts 2R1 and 2R2, the reversing bridge network being connected in series with field winding F2 and normally open contacts M2 of contactor M across lines L1 and L2. Motor 3 is provided with an armature A3 and a series field winding F3. Armature A3 is connected in a reversing bridge network comprising forward contacts 3F1 and 3F2 and reverse contacts 3R1 and 3R2, the reversing bridge network being connected in series with field winding F3 and normally open contacts M3 of contactor M across lines L1 and L2.

Dynamic braking resistors DBR1 and DBR2 are connected in a first loop circuit in series with armature A2 of motor 2 and field winding F1 of motor 1 through normally closed contacts DB1 and DB2 of dynamic braking relay DB. Dynamic braking resistors DBR3, DBR4 and DBR5 are connected in a second loop circuit in series with armature A1 of motor 1 and field windings F2 and F3 of motors 2 and 3 through normally closed contacts DB3, DB4, and DB5 of the aforementioned relay DB. And dynamic braking resistor DBR6 is connected in a third loop circuit in series with armature A3 through normally closed contacts DB6 of the aforementioned relay DB. It will be apparent that armature A2 of motor 2 is connected to the reversing bridge network of field winding F1 of motor 1 so that the counter EMF of armature A2 energizes field winding F1 in the forward direction following forward operation and in the reverse direction following reverse operation.

The operating coil of an undervoltage relay UV is connected through a normally closed master switch MS across lines L1 and L2. Relay UV is provided with normally open contacts UV1 for connecting the operating coil of the aforementioned dynamic braking relay DB across lines L1 and L2. Relay UV is also provided with normally open contacts UV2 connected in the energizing circuits of the operating coils of a main contactor M and forward and reverse contactors F and R. The energizing circuit of the operating coil of contactor M also includes normally open contacts DB7 and the energizing circuit of the operating coils of contactors F and R also include contacts DB8 of the aforementioned relay DB. There is additionally provided a double-throw switch SW having upper and lower stationary contacts connected to the operating coils of contactors F and R, respectively, and therethrough to line L2, and a movable contact for selective closure with either of the stationary contacts. While a single operating coil has been shown for operating main contactor contacts M1–3 for motors 1, 2 and 3 to avoid complicating the drawing, it will be understood that three parallel-connected operating coils would normally be provided for operating contacts M1, M2 and M3, respectively. Similarly, individual forward and reverse contactor operating coils would be provided for the respective motors. As will be apparent, interlocking contacts DB7 and DB8 prevent energization of the motors while dynamic braking is being applied.

The operation of the system of FIG. 1 will now be described. Let it be assumed that suitable direct current power is applied to lines L1 and L2 to energize the operating coil of relay UV. Contacts UV1 close to effect energization of the operating coil of relay DB and contacts UV2 close a point in the energizing circuit of contactors M, F and R. Relay DB opens contacts DB1 through DB6 to interrupt the dynamic braking loop circuits, closes contacts DB7 to energize contactor M and closes contacts DB8 to close a point in the energizing circuit of contactors F and R. Main contactor M closes contacts M1, M2 and M3 in the power circuits of motors 1, 2 and 3.

Closure of switch SW to its upper contact effects energization of the operating coil of forward contactors F. For exemplary purposes, it may be assumed that contactor F closes contacts 1F1, 1F2, 2F1, 2F2, 3F1 and 3F2 to energize motors 1, 2 and 3 in the forward direction. The circuit of motor 1 may be traced from line L1 through contacts 1F1, field winding F1, contacts 1F2, armature A1 and contacts M1 to line L2. The circuit of motor 2 may be traced from line L1 through contacts 2F1, armature A2, contacts 2F2, field winding F2 and contacts M2 to line L2. And the circuit of motor 3 may be traced from line L1 through contacts 3F1, armature A3, contacts 3F2, field winding F3 and contacts M3 to line L2. As a result, motors 1, 2 and 3 run in the forward direction.

In the event of faulty condition causing voltage failure or if reduced voltage occurs, relay UV opens contacts UV1 and UV2. Relay UV responds to voltage failure or decrease in voltage below a predetermined value required for motor operation. Contacts UV2 interrupt energization of contactors M and F, opening contacts 1F1, 1F2, 2F1, 2F2, 3F1 and 3F2 and contacts M1, M2 and M3 to disconnect power from the motors. Contacts UV1 interrupt energization of relay DB, closing contacts DB1 through DB6 and opening contacts DB7 and DB8. As a result, three dynamic braking loop circuits are completed as follows: from the upper positive terminal of armature A2 through contacts DB2, resistor DBR2, junction of contacts 1F1 and 1R2, field winding F1, junction of contacts 1R1 and 1F2, resistor DBR1 and contacts DB1 to the lower negative terminal of armature A2; from the left-hand positive terminal of armature A1 through resistor DBR3, contacts DB3, field winding F2, resistor DBR5, contacts DB5, field winding F3, contact DB4 and resistor DBR4 to the right-hand negative terminal of armature A1; and from the upper positive terminal of armature A3 through contacts DB6 and resistor DBR6 to the lower negative terminal of armature A3. The armature-generated-current of motor 2 excites the field winding of motor 1, the armature-generated current of motor 1 excites the field windings of motors 2 and 3, and the armature-generated-current of motor 3 is dissipated in resistor DBR6. As a result, dynamic braking is applied to all three motors. To this end, the braking effect of one of the motors is immediately reflected in the field excitations of the other motors to maintain braking on all three motors.

The motors may be operated in the reverse direction by closing switch SW to its lower stationary contact to energize reverse contactor R. As a result, reverse contacts 1R1, 1R2, 2R1, 2R2, 3R1 and 3R2 close to operate the motors in the reverse direction. It will be apparent that for reverse operation, the energizations of the field winding of motor 1 and the armatures of motors 2 and 3 are reversed.

In the event of voltage failure, contacts DB1–6 close as hereinbefore described to establish the aforementioned three dynamic braking loop circuits. As will be apparent, the counter E.M.F. of motor 2 is now reversed, so that for dynamic braking, field winding F1 of motor 1 is excited in the same direction as it was energized for reverse operation, that is, from the junction of contacts 1R1 and 1F2 through the field winding to the junction of contacts 1F1 and 1R2.

The modification shown in FIG. 2 is similar to the system of FIG. 1 except that the armature of motor 1 is connected to the field winding of only motor 3 and the armature of motor 3 is connected to excite the field winding of motor 2. In FIG. 2, reference characters similar to those of FIG. 1 are employed for like elemnts. Resistors DBR1 and DBR2 are connected in a first dynamic braking loop circuit similar to that of FIG. 1. Resistors DBR3 and DBR4 are connected in a second dynamic braking loop circuit in series with armature A1 of motor 1 and field winding F3 of motor 3 through normally closed contacts DB3 and DB4. And resistors DBR5 and DBR6 are connected in a third dynamic braking loop circuit in series with armature A3 of motor 3 and field winding F2 of motor 2 through normally closed contacts DB5 and DB6. To maintain unidirectional excitation of field winding F2 with reversal of the counter E.M.F. of motor 3, a rectifier bridge RB is employed in the dynamic braking loop circuit. To this end, one input terminal of bridge RB is connected through contacts DB5 and resistor DBR5 to the upper terminal of armature A3 and the other input terminal of bridge RB is connected through contacts DB6 and resistor DBR6 to the lower terminal of armature A3. The positive output terminal of bridge RB is connected to the positive end of field winding F2 and the negative output terminal of bridge RB is connected to the negative end of field winding F2.

Let it be assumed that motors 1, 2 and 3 are operating in either the forward or reverse direction and a voltage failure occurs to disconnect power from the motors as described in connection with FIG. 1. Contacts DB1 and DB2 close to complete a first dynamic braking loop circuit wherein armature A2 excites field winding F1 in the same direction as the last power supply energization thereof. Contacts DB3 and DB4 close to complete a second dynamic braking loop circuit from the left-hand terminal of armature A1 through resistor DBR3, contacts DB3, field winding F3, contacts DB4 and resistor DBR4 to the right-hand terminal of armature A1. Contacts DB5 and DB6 close to complete a third dynamic braking loop circuit from armature A3 to field winding F2. If the motors are operated in the forward direction, the third loop circuit extends from the upper positive terminal of armature A3 through resistor DBR5, contacts DB5, lower input and left-hand positive output terminals of bridge RB, field winding F2, right-hand negative and upper input terminals of bridge RB, contacts DB6 and resistor DBR6 to the lower negative terminal of armature A3. If the motors are operated in the reverse direction, the third loop circuit extends from the lower positive terminal of armature A3 through resistor DBR6, contacts DB6, upper input and left-hand positive terminals of bridge RB, field winding F2, right-hand negative and lower input terminals of bridge RB, contacts DB5 and resistor DBR5 to the upper negative terminal of armature A3.

The modification shown in FIG. 3 is similar to the system of FIG. 2 except that spring-closed relay contacts are employed in place of the rectifier bridge to afford unidirectional excitation of field winding F2 with reversal of the counter E.M.F. of motor 3. Also, operating coils for these contacts are connected so as to respond to the generated voltage of armature A3.

More specifically, the left-hand positive end of field winding F2 is connected through normally closed contacts RC1 and FC2 in series to the right-hand negative end thereof and the junction of these contacts is connected through dynamic braking resistor DBR5 to the junction of contacts 3F1 and 3R2 in the reversing bridge network of armature A3. The left-hand positive end of field winding F2 is also connected through normally closed contacts FC1 and RC2 in series to the right-hand negative end thereof and the junction of these contacts is connected through dynamic braking resistor DBR6 to the junction of contacts 3R1 and 3F2 in the reversing bridge network of armature A3.

The operating coil of a forward dynamic braking control relay FC for operating contacts FC1 and FC2 is connected in a circuit extending from line L1 through a rectifier DR1, coil of relay FC, normally open contacts DB9 and resistor R to line L2. The junction of the coil of relay FC and contacts DB9 is connected through normally closed contacts DB5 to the lower terminal of armature A3. The upper terminal of armature A3 is connected through a rectifier DR2 to the junction of rectifier DR1 and the coil of relay FC. The operating coil of a reverse dynamic braking control relay RC for operating contacts RC1 and RC2 is connected in a circuit extending from line L1 through a rectifier DR3, coil of relay RC, normally open contacts DB10 and resistor R to line L2. The junction of the coil of relay RC and contacts DB10 is connected through normally closed contacts DB6 to the upper terminal of armature A3. The lower terminal of armature A3 is connected through a rectifier DR4 to the junction of rectifier DR3 and the coil of relay RC.

Let it be assumed that power is applied to lines L1 and L2 to energize the dynamic braking relay as described in connection with FIG. 2. As a result, the first and second dynamic braking loop circuits are interrupted. Also, contacts DB9 and DB10 complete the aforementioned energizing circuits for relays FC and RC, respectively, and contacts DB5 and DB6 disconnect the operating coils of relays FC and RC, respectively from armature A3. Energization of relays FC and RC effects opening of contacts FC1, FC2, RC1 and RC2 and these contacts remain open during normal forward or reverse operation of the motors to maintain the third dynamic braking loop circuit open.

In the event a voltage failure occurs during forward operation of the motors, the dynamic braking relay completes the first and second dynamic braking loop circuits as hereinbefore described in connection with FIG. 2 and the motors are disconnected from the power supply lines. Also, contacts DB9 and DB10 open and contacts DB5 and DB6 close. Contacts DB10 disconnect the operating coil of relay RC from line L2 to deenergize the same thereby to close contacts RC1 and RC2. Contacts DB9 disconnect the operating coil of relay FC from line L2; however, relay FC is re-energized or maintained energized by the generated voltage of armature A3 in a circuit extending from the upper terminal of armature A3 through rectifier DR2, the operating coil of relay FC and contacts DB5 to the lower terminal of armature A3. Although contacts DB6 close, rectifier DR4 blocks current flow through the operating coil of relay RC to prevent reenergization thereof. Contacts RC1 and RC2 being closed and contacts FC1 and FC2 open, a third dynamic braking loop circuit is established from the upper terminal of armature A3 through resistor DBR5, contacts RC1, field winding F2, contacts RC2 and resistor DBR6 to the lower terminal of armature A3.

In the event a voltage failure occurs during reverse operation of the motors, the motors are disconnected from the power supply lines and the first and second dynamic braking loop circuits are completed as hereinbefore described in connection with FIG. 2. Also, contacts DB9 and DB10 open and contacts DB5 and DB6 close to establish the conditions hereinbefore described. As the generated voltage of armature A3 is reversed, relay FC is deenergized and relay RC is re-energized or maintained energized in a circuit extending from the lower terminal of armature A3 through rectifier DR4, the operating coil of relay RC and contacts DB6 to the upper terminal of armature A3. Rectifier DR2 blocks current flow through the operating coil of relay FC to prevent re-energization thereof. Contacts RC1 and RC2 being open and contacts FC1 and FC2 closed a third dynamic braking loop circuit is established from the lower terminal of armature A3 through resistor DBR6, contacts FC1, field winding F2, contacts FC2 and resistor DBR5 to the upper terminal of armature A3. Thus, field winding F2 is excited by the armature-generated-current of motor 3 always in the proper direction regardless of whether dynamic braking follows forward or reverse operation of the motors.

The modification shown in FIG. 4 is similar to the system of FIG. 3 except that the reversing contacts of motor 3 are employed in place of the spring-closed contacts of FIG. 3 for connecting armature A3 to field winding F2 for dynamic braking. To this end, the junction of contacts 3R2 and 3F2 is connected through normally closed contacts DB5 and resistor DBR5 to the left-hand positive end of field winding F2. The junction of contacts 3F1 and 3R1 is connected through normally closed contacts DB6 and resistor DBR6 to the right-hand negative end of field winding F2. The upper terminal of armature A3 is connected through a rectifier DR5, normally closed contacts DB9 and the operating coil of reverse contactor 3R of motor 3 to the lower terminal of armature A3. The lower terminal of armature A3 is connected through the operating coil of forward contactor 3F of motor 3, normally closed contacts DB10 and rectifier DR6 to the upper terminal of armature A3. The operating coils of contactors 3F and 3R of motor 3 are also connected through normally open switch SW and contacts DB8, also shown in FIG. 1, across lines L1 and L2. The reversing contactors for motors 1 and 2 have not been shown in FIG. 4 to avoid complicating the drawing.

Let it be assumed that a voltage failure occurs when the DR6 of the upper terminal of armature A3. As a result, result, the motors are disconnected from the power supply lines and dynamic braking relay DB is deenergized as hereinbefore described to complete the first and second dynamic braking loop circuits. Relay DB also closes contacts DB5, DB6, DB9 and DB10 and opens contacts DB8. Contacts DB5 and DB6 close points in the third dynamic braking loop circuit. Contacts DB8 disconnect the operating coils of contactors 3F and 3R from line L2. Contacts DB9 complete an energizing circuit from the upper terminal of armature A3 through rectifier DR5, contacts DB9 and the operating coil of contactor 3R to the lower terminal of armature A3. As a result, the generated voltage of armature A3 energizes contactor 3R to close contacts 3R1 and 3R2. This establishes the third dynamic braking loop circuit extending from the upper terminal of armature A3 through contacts 3R2 and DB5, resistor DBR5, field winding F2, resistor DBR6 and contacts DB6 and 3R1 to the lower terminal of armature A3. This dynamic braking loop circuit is maintained until the speed of motor 3 decreases and the armature-generated-voltage of motor 3 decreases to a value whereby contactor 3R is deenergized.

If a voltage failure occurs when the motors are operating in the reverse direction, the motors are disconnected from the power supply lines and dynamic braking relay DB is deenergized as hereinbefore described to complete the first and second dynamic braking loop circuits. Contacts DB5, DB6, DB9 and DB10 close and contacts DB8 open. The generated voltage of motor 3 beng now reversed, contactor 3F is energized in a circuit extending from the lower terminal of armature A3 through the operating coil of contactor 3F, contacts DB10 and rectifier DR6 to the upper terminal of armature A3. As a result, the third dynamic braking loop circuit is completed from the lower terminal of armature A3 through contacts 3F2 and DB5, resistor DBR5, field winding F2, resistor DBR6 and contacts DB6 and 3F1 to the upper terminal of armature A3. As before, this loop circuit is maintained until the speed of motor 3 decreases and the armature-generated-voltage decreases to a value causing deenergization of contactor 3F.

In the modifications shown in FIGS. 2, 3 and 4, dynamic braking is applied to all three motors. To this end, any change in the braking effect of one of the motors is immediately reflected in the field excitation of a second motor to control the latter as a function of such change. Such control of the second motor is reflected in the field excitation of the third motor to control the latter which in turn reflects back a change in the field excitation of the first motor. This tends to maintain essentially equal dynamic braking on all three motors.

It may be assumed that the modifications shown in FIGS. 2, 3 and 4 are each provided with a control circuit including an undervoltage relay UV, a master switch MS, main contactor M, dynamic braking relay DB and forward and reverse contactors as described in connection with FIG. 1. Therefore, in the event of an overhauling load, switch MS may be pressed to establish dynamic braking.

I claim:

1. In a controller for a multi-motor drive having at least three direct current motors each having an armature winding and a series field winding, in combination, electroresponsive switching means for connecting the motors in parallel across a direct current power supply source for either forward or reverse operation, said switching means comprising means for reversing the energization of the field winding of one of the motors, and the armature windings of the other motors, dynamic braking means for the motors, and means for disconnecting the motors from the power supply source when energized for either forward or reverse operation and substantially simultaneously rendering said dynamic braking means effective, said dynamic braking means comprising means for energizing the series field winding of each motor by the current generated by one of the other motors in the same direction as the immediately preceding power energization of each such field winding regardless of whether the motors were operated in the forward or reverse direction.

2. The invention defined in claim 1, wherein said disconnecting means comprises means responsive to predetermined decrease of the power supply voltage for effecting said disconnection and for rendering said dynamic braking means effective.

3. The invention defined in claim 1, wherein said disconnecting means comprises switching means manually operable for effecting said disconnection in the event of an overhauling load and for rendering said dynamic braking means effective.

4. The invention defined in claim 1, wherein the last mentioned means comprises means for energizing the series field winding of a first one of the motors by the current generated by a second one of the motors, means for energizing the series field winding of said second motor and the series field winding of a third one of said motors by the current generated by said first motor, and means for connecting a dynamic braking loop circuit to the armature of said third motor.

5. The invention defined in claim 1, wherein the last mentioned means comprises means for energizing the series field winding of a first one of the motors by the current generated by a second one of the motors, means for energizing the series field winding of a third one of said motors by the current generated by said first motor, and means for energizing the series field winding of said second motor by the current generated by said third motor.

6. In a control system, in combination, three motors, each motor having an armature winding and a series field winding, forward switching means for connecting the motors in parallel to a power supply source for operation in the forward direction, reverse switching means for alternatively reconnecting the motors in parallel to the power supply source for operation in the reverse direction, said reverse switching means comprising means for reversing the energization of the field winding of one of the motors and the armature winding of two of said motors, and raking control means for the motors comprising means for disconnecting the motors from the power supply source and dynamic braking means for said motors operable concurrently with interruption of said power supply connections to the motors, said dynamic braking means comprising a plurality of dynamic braking resistors and means for energizing in a predetermined direction the series field winding of each said motor from the armature-generated-current of one of the other two motors in series with at least one of said resistors, said predetermined direction of energization of the series field winding of each motor being the same as the direction of power energization which caused motor operation regardless of whether the motors were operated in the forward or reverse direction.

7. In a controller for a multi-motor drive having three motors each having an armature winding and a series field winding and switching means for connecting the motors in parallel across a power supply source for operation in the forward direction, the improvement comprising electroresponsive switching means for reversing the field energization of a first one of the motors and for reversing the armature energization of the second and third motor to reverse the direction of operation thereof, dynamic braking control means, and means comprising said electroresponsive switching means for disconnecting the motors from the power supply source and for simultaneously rendering said dynamic braking control means effective, said dynamic braking control means comprising deenergizable switching means, means for energizing the series field winding of each said motor from the current generated by one of the other two motors in the same direction as the immediately preceding power energization thereof regardless of whether the motors were operated in the forward or reverse direction.

8. The invention defined in claim 7, wherein the last mentioned means comprises means for connecting the series field winding of said first motor in a first dynamic braking loop circuit with the armature winding of said second motor whereby the current generated by said second motor energizes the series field winding of said first motor in the same direction as the previous power energization thereof regardless of whether the motors were operated in the forward or reverse direction, means for connecting the series field winding of said third motor in a second dynamic braking loop circuit with the armature winding of said first motor whereby the current generated by said first motor energizes the series field winding of said third motor in the same direction as the power energization thereof, and means for connecting the series field winding of said second motor in a third dynamic braking loop circuit with the armature winding of said third motor whereby the current generated by said third motor energizes the series field winding of said second motor in the same direction as the power energization thereof regardless of whether the motors were operated in the forward or reverse direction.

9. The invention defined in claim 8, wherein the last mentioned means comprises a rectifier bridge having its input terminals connected in said third dynamic braking loop circuit and its positive and negative output terminals connected across the series field winding of said second motor to energize the same in the same direction as the power energization thereof.

10. The invention defined in claim 8, wherein the last mentioned means comprises a contact bridge having first and second pairs of normally closed contacts with the contacts of each pair being connected in opposite legs of said bridge and having its input terminals connected in said third dynamic braking loop circuit and its output terminals connected across the series field winding of said second motor, the first input terminal of said bridge being at the junction of the first contact of the first pair and the second contact of the second pair and the second input terminal of said bridge being at the junction of the first contact of the second pair and the second contact of the first pair, the first output terminal of said bridge being at the junction of the first contact of the first pair and the first contact of the second pair and the second output terminal of said bridge being at the junction of the second contact of the first pair and the second contact of the second pair, means for opening said first and second pairs of contacts during normal operation of the motors in the forward or reverse direction, means responsive to said dynamic braking control means and the current generated by said third motor following forward energization of the motors for closing said second pair of contacts and for maintaining said first pair of contacts open to energize the series field winding of said second motor by the current generated by said third motor in the same direction as the power energization thereof, and means responsive to said dynamic braking control means and the current generated by said third motor following reverse energization of the motors for closing said first pair of contacts and for maintaining said second pair of contacts open to energize the series field winding of said second motor by the current generated by said third motor in the same direction as the power energization thereof.

11. The invention defined in claim 8, wherein the last mentioned means comprises said forward and reverse switching means, means responsive to said dynamic braking control means and the current generated by said third motor following forward energization of the motors for reclosing said reverse switching means and for maintaining said forward switching means open whereby the current generated by said third motor energizes the series field winding of said second motor in the same direction as the power energization thereof, and means responsive to said dynamic braking control means and the current generated by said third motor following reverse energization of the motors for reclosing said forward switching means and for maintaining said reverse switching means open whereby the current generated by said third motor energizes the series field winding of said second motor in the same direction as the power energization thereof.

References Cited in the file of this patent
UNITED STATES PATENTS

| | | |
|---|---|---|
| 1,985,706 | Wilson | Dec. 25, 1934 |
| 2,515,982 | Brane | July 18, 1950 |
| 2,605,454 | Grepe | July 29, 1952 |
| 2,784,360 | Myles | Mar. 5, 1957 |

UNITED STATES PATENT OFFICE
CERTIFICATE OF CORRECTION

Patent No. 3,059,160                                October 16, 1962

Edward J. Posselt

It is hereby certified that error appears in the above numbered patent requiring correction and that the said Letters Patent should read as corrected below.

Column 3, line 64, for "elemnts" read -- elements --; column 6, line 14, for "DR6 of the upper terminal of armature A3" read -- motors are operating in the forward direction --; line 15, strike out "result,"; same column 6, line 43, for "beng" read -- being --; column 7, line 58, for "raking" read -- braking --.

Signed and sealed this 19th day of March 1963.

(SEAL)
Attest:

ESTON G. JOHNSON                                DAVID L. LADD
Attesting Officer                                    Commissioner of Patents